(12) United States Patent (10) Patent No.: US 7,849,108 B1
Kapor (45) Date of Patent: Dec. 7, 2010

(54) METHODS AND SYSTEMS FOR ESTABLISHING A DATABASE

(75) Inventor: Steven Kapor, Cincinnati, OH (US)

(73) Assignee: Fundriver, Inc., Cincinnati, OH (US)

( * ) Notice: Subject to any disclaimer, the term of this patent is extended or adjusted under 35 U.S.C. 154(b) by 364 days.

(21) Appl. No.: 12/047,737

(22) Filed: Mar. 13, 2008

Related U.S. Application Data

(60) Provisional application No. 60/894,678, filed on Mar. 13, 2007.

(51) Int. Cl.
*G06F 17/30* (2006.01)

(52) U.S. Cl. ................. 707/804; 707/601; 707/602; 707/805; 707/809

(58) Field of Classification Search ............... None
See application file for complete search history.

(56) References Cited

U.S. PATENT DOCUMENTS

| | | | | |
|---|---|---|---|---|
| 5,293,615 | A * | 3/1994 | Amada | ............... 1/1 |
| 5,765,156 | A | 6/1998 | Guzak | |
| 5,819,238 | A | 10/1998 | Fernholz | |
| 5,819,293 | A | 10/1998 | Comer | |
| 6,055,541 | A | 4/2000 | Solecki | |
| 6,161,098 | A | 12/2000 | Wallman | |
| 6,275,807 | B1 | 8/2001 | Schirripa | |
| 6,360,210 | B1 | 3/2002 | Wallman | |
| 6,360,246 | B1 | 3/2002 | Begley | |
| 6,502,098 | B2 * | 12/2002 | Lau | ............... 1/1 |
| 6,539,370 | B1 | 3/2003 | Chang | |
| 6,631,497 | B1 * | 10/2003 | Jamshidi et al. | ............ 715/205 |
| 6,721,722 | B1 | 4/2004 | Turba | |
| 6,898,599 | B2 | 5/2005 | Young | |
| 6,996,589 | B1 * | 2/2006 | Jayaram et al. | ............... 1/1 |
| 7,194,490 | B2 * | 3/2007 | Zee | ............... 1/1 |
| 7,457,819 | B2 * | 11/2008 | Jhingan | ............... 1/1 |
| 2003/0188256 | A1 | 10/2003 | Aureglia et al. | |
| 2004/0044679 | A1 | 3/2004 | Chang et al. | |
| 2004/0088232 | A1 | 5/2004 | Minnis, Jr. | |
| 2004/0133489 | A1 | 7/2004 | Stremler et al. | |
| 2004/0162775 | A1 | 8/2004 | Winklevoss et al. | |
| 2004/0172584 | A1 | 9/2004 | Jones et al. | |
| 2005/0055626 | A1 | 3/2005 | Kotler et al. | |
| 2005/0114146 | A1 | 5/2005 | Barkley | |
| 2005/0125245 | A1 | 6/2005 | Kitt et al. | |
| 2005/0172241 | A1 | 8/2005 | Daniels et al. | |
| 2005/0256791 | A1 | 11/2005 | Schaub | |
| 2008/0209444 | A1 * | 8/2008 | Garrett et al. | ............ 719/320 |

FOREIGN PATENT DOCUMENTS

| | | | |
|---|---|---|---|
| WO | WO 93 00642 | * | 1/1993 |
| WO | WO 2005033980 | * | 4/2005 |
| WO | WO 2005/065278 A2 | * | 7/2005 |

* cited by examiner

*Primary Examiner*—Etienne P LeRoux
*Assistant Examiner*—Hung D Le
(74) *Attorney, Agent, or Firm*—Dinsmore & Shohl LLP

(57) ABSTRACT

In one embodiment, a system for converting a flat-file containing pooled endowment fund data into a fund management database is provided. The system comprises a client computer, an import template, and a server. The server further comprises a database and an import utility, wherein data is moved from a previous source to the import template on the client computer and sent to the server. The import utility receives, parses and rationalizes import template data, converts balances, loads historical data and configures a relational database for use. The system allows a user to create a relational database from a flat-file, such as a spreadsheet.

16 Claims, 11 Drawing Sheets

FIG. 3

| Column | Description |
|---|---|
| Account Number (Required) | The principal account number in the general ledger. *Be sure to provide a unique fund number for each entry.* |
| Auxiliary I.D. | An additional account number such as a donor I.D. number. |
| Fund Name (Required) | The name of the fund. |
| Investment Pool | Name given to the Investment pool the fund is participating in. |
| Cost | Principal, Corpus, or Total accumulated historical gifts as of the same date as the market value provided. |
| Market Value (Required if not providing units) | Provide either a market value for each fund or number of units for each fund. In most cases you will provide market values instead of units unless your distribution method is based on the unit price. |
| Units (Required if not providing market value) | If you are providing units, enter the unit price in the investment pools tab. |
| Book Value | Represents gifts, plus income, plus realized gains, minus distributions. Not used by all organizations. |
| Non-pooled assets | Assets that belong to a specific fund but are not part of the investment pool. For example real estate gifted to a specific fund. |
| Fund Category | Enter Permanently Restricted, Temporarily Restricted, Unrestricted or Board Designated |
| Foundation | Use this to designate either university or foundation assets |
| Department | The designated department of the fund. This can also be used to identify org. codes. |
| Purpose | Purpose category of the fund. For example, scholarship, professorship or maintenance. |
| Spending Rule | Use this field to differentiate between distribution methods. For example use this column to mark the funds that require a manual distribution calculation. |
| Reinvest Type | Enter %, $, P or leave blank:<br><br>% = A certain % of income automatically |

FIG. 4

METHODS AND SYSTEMS FOR ESTABLISHING A DATABASE

CROSS-REFERENCE TO RELATED APPLICATIONS

This application claims the benefit of U.S. Provisional Patent Application Ser. No. 60/894,678, filed Mar. 13, 2007, the entire disclosure of which is hereby incorporated herein by reference. This application is related to U.S. Patent Application Ser. No. 60/894,607 filed on Mar. 13, 2007 and entitled "Methods and Systems for Management of Endowment or Pooled Investment Funds", the entire disclosure of which is hereby incorporated herein by reference.

TECHNICAL FIELD

The present invention relates generally to methods and systems for establishing a database, such as for an endowment or pooled fund management system, and in one embodiment to a method and system whereby pooled endowment fund information can be imported from a flat-file format into a relational database utilizing a standardized spreadsheet template.

BACKGROUND

Many charitable, non-profit and educational organizations (collectively "non-profit organizations") are funded by endowment funds from various donors and sources. Endowment funds are those of which that are received from a donor with the restriction that the principal is not expendable. Most commonly, endowment funds are pooled together when the organization has discretion as to how the funds are invested, and when the funds have similar investment objectives.

A unitized accounting system is an accounting system commonly used by non-profit organizations that accounts for a fund's interest in an investment pool on the basis of units. Each individual fund receives units that are proportional to the fund's share in the investment pool. A donor receives units when money is deposited into the pool. Alternately, units are reduced when money is removed. Non-profit organizations use unitization to accurately distribute cash income earned between the participating funds in the pool, accurately distribute changes in investment market values between the participating funds in the pool, and accurately compute the pool's investment performance. Although advantageous, unitization requires complex and burdensome calculations to very large amounts of financial data. Currently, many organizations use tedious spreadsheets to perform the unitization of pooled investment funds. The use of spreadsheets can be time-consuming and highly prone to human error.

Further, the unitization calculations can require processing power that will likely over-burden a non-profit organization's computing system. Accordingly, it can be very advantageous to monitor the funds, perform the calculations, and run reports using a pooled endowment management system. However, conversion from existing spreadsheet systems to the management system can be required to allow for use of such a system.

Presently, the importation of fund data into a fund endowment management system can be very tedious, time consuming and prone to human error. A pooled endowment fund is comprised of vast amounts of critical data. It may comprise many funds, each with its own transaction and distribution history, balances and historical data. Manual entry of the data into a database of the management system can often lead to serious errors and may create significant problems for the pooled endowment fund. Therefore, a system and method to import pooled endowment fund data into a database that is automated and efficient is desired.

Additionally, many organizations use flat-files, such as spreadsheets, to perform subaccounting and administrative functions. The use of spreadsheets is inefficient because many records are required, and the ability to query and report data is extremely limited. Spreadsheets, require either manual selection of the records to be reported on, or the development of individual macros for each query or report.

Non-profit organizations differ from commercial enterprises in the types of financial reporting they are required to submit. In addition to standard financial reporting required of commercial enterprises, non-profit organizations are further burdened by strict Financial Accounting Standards Board ("FASB") requirements that require non-profit organizations to show that they are good stewards of their endowment funds. More specifically, non-profit organizations must show that they are spending money in accordance with their own distribution rules, and also in accordance with distribution and investing rules set by individual donors. Additionally, users are required to track the financial growth of the pooled endowment funds. Spreadsheets can be difficult to use for such tracking and reporting purposes.

Therefore, because many non-profit organizations use cumbersome spreadsheets for accounting functions, an easy and standardized system and method to convert spreadsheet information into a fund management system is desired.

SUMMARY

In one embodiment, a system for establishing a database for a pooled endowment fund system is provided. The system includes an import template provided in a web browser program comprising a plurality of column headers, residing in a client computer and configured to accept pooled endowment data from a flat file source, a server coupled to the client computer, an import utility configured to receive the pooled endowment data from the import template, a plurality of holding tables comprising names corresponding to the plurality of column headers and a relational database. The import utility reads the column header in the import template and parses the pooled endowment data received from the import template according the column header by placing the pooled endowment data corresponding to an individual column into an matching holding table. The import utility also relates the pooled endowment data by assigning a key number to individual categories in the holding tables, eliminating duplicated categories in the holding tables and linking the key number to an endowment fund record within the relational database.

The system allows a user to create a relational database from a flat-file, such as a spreadsheet. In some embodiments, the import template is a formatted Excel spreadsheet. In other embodiments, the import template may be a Lotus spreadsheet or the like. Also, in some embodiments, the template may comprise various tabs for different categorical information, such as fund, investment pool, income account, historical data gift history, and distribution data, for example. In other embodiments, all required data may reside on one tab of the spreadsheet.

In one embodiment, the import utility is a manual utility in which a server administrator receives and loads the import template data into the import utility. In other embodiments, the import utility is automated, wherein import template data is automatically loaded into the import utility.

According to another embodiment, a method for establishing a database for a pooled endowment fund system is provided. The method includes importing pooled endowment data from a flat file source into an import template provided in a web browser comprising a plurality of column headers, wherein the pooled endowment data corresponds to a plurality of endowment funds that form an endowment pool. The method further includes creating a plurality holding tables that correspond to the plurality of column headers of the import template and parsing the imported pooled endowment data into corresponding holding tables. Keys are assigned to each of a plurality of unique categories within the pooled endowment data located in the plurality of holding tables, and duplicate categories within the pooled endowment data located in the plurality of holding tables are deleted. The method further includes linking the keys to a pooled endowment fund record in a relational database and appending the relational database with seed data.

BRIEF DESCRIPTION OF THE DRAWINGS

The following detailed description will be more fully understood in view of the drawings in which:

FIG. 3 illustrates an example of an import template, according to one or more aspects of the present inventions;

FIG. 4 is an example of a table that describes column information that may be provided in an import template, according to one or more aspects of the present inventions;

Figure 1:
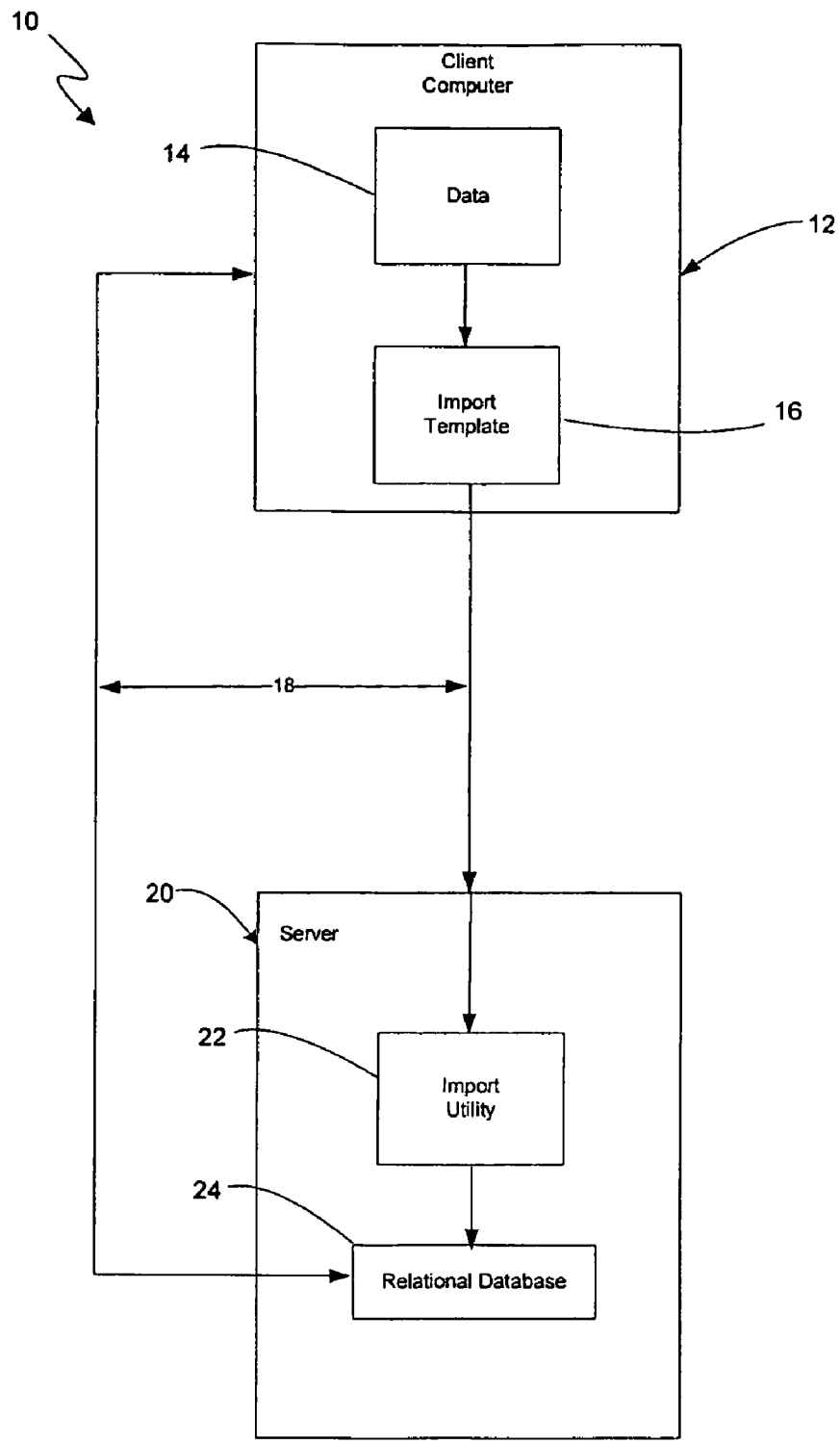
FIG. 1 is a schematic illustration of an example of a flat-file to relational database conversion system for pooled endowment fund data according to one or more aspects of the present inventions.

The embodiments et forth in the drawings are illustrative in nature and are not intended to be limiting of the invention defined by the claims. Moreover, individual features of the drawings and the invention will be more fully apparent and understood in view of the detailed description.

DETAILED DESCRIPTION OF THE ILLUSTRATIVE EMBODIMENTS

Reference will now be made in detail to various embodiments which are illustrated in the accompanying drawings, wherein like numerals indicate similar elements throughout the views.

One illustrative embodiment where various aspects of the present inventions can be utilized is illustrated in FIG. 1. The system comprises a client computer 12, which holds endowment fund data from a previous source 14 and an import template 16. The system also comprises a server 20, which is connected to the client computer 12 through the Internet or other network via a communication link 18. In one embodiment, the communication link 40 is a wired connection, such as Ethernet, for example. In other embodiments, the communication link may be a wire-less technology such as Wi-Fi, Bluetooth, RF, IR, or the like. In one exemplary embodiment, the network connection 60 is a wired connection, such as Ethernet.

The server 20 further comprises an import utility 22 and a relational database 24, which is created after running the import utility 22.

Figure 2:
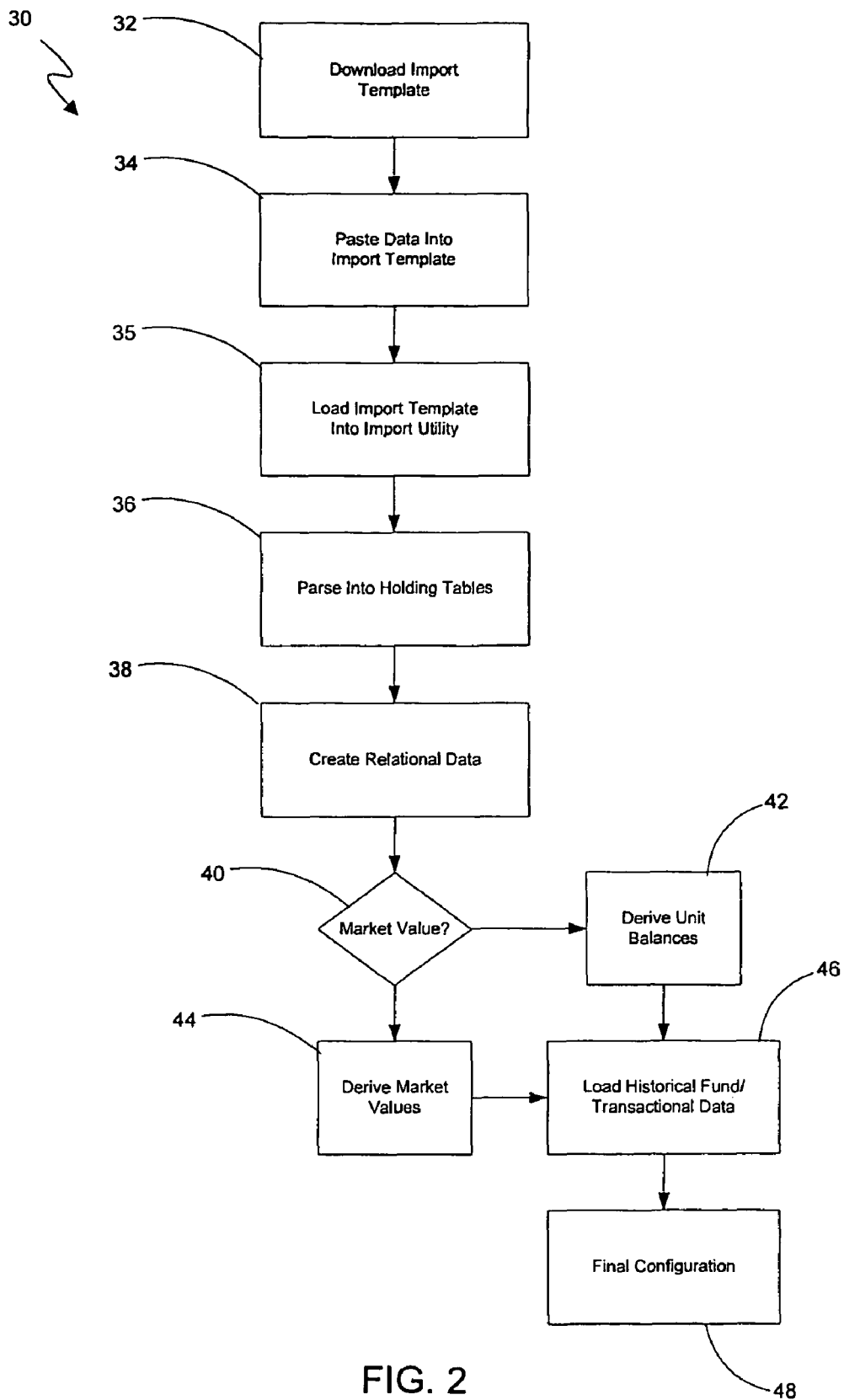
FIG. 2 is a flow diagram illustrating an example of a method for loading pooled endowment fund data into a template, sending the template to an import utility and creating a relational database, according to one or more aspects of the present inventions.

FIG. 2 is a flow chart providing a schematic illustration of an example of a process for loading pooled endowment fund data into a template, sending the template to an import utility and creating a relational database, according to aspects of the present inventions. With reference to FIGS. 1-2, the import template 16 in this example is a formatted spreadsheet design to be read by the import utility 22. In this example, the process starts at block 32 where a user downloads the import template 16. Downloading the import template 16 maybe effectuated using any means, including for example, e-mail, CD-ROM or Internet download. As illustrated in block 34, data is entered into the import template 16 by copying and pasting from previous source 14, such as a flat-file spreadsheet, to the clipboard or moving data from the previous source 14 to the import template 16. It is contemplated that other methods of entering data into the import template 16 are possible.

Figure 3:
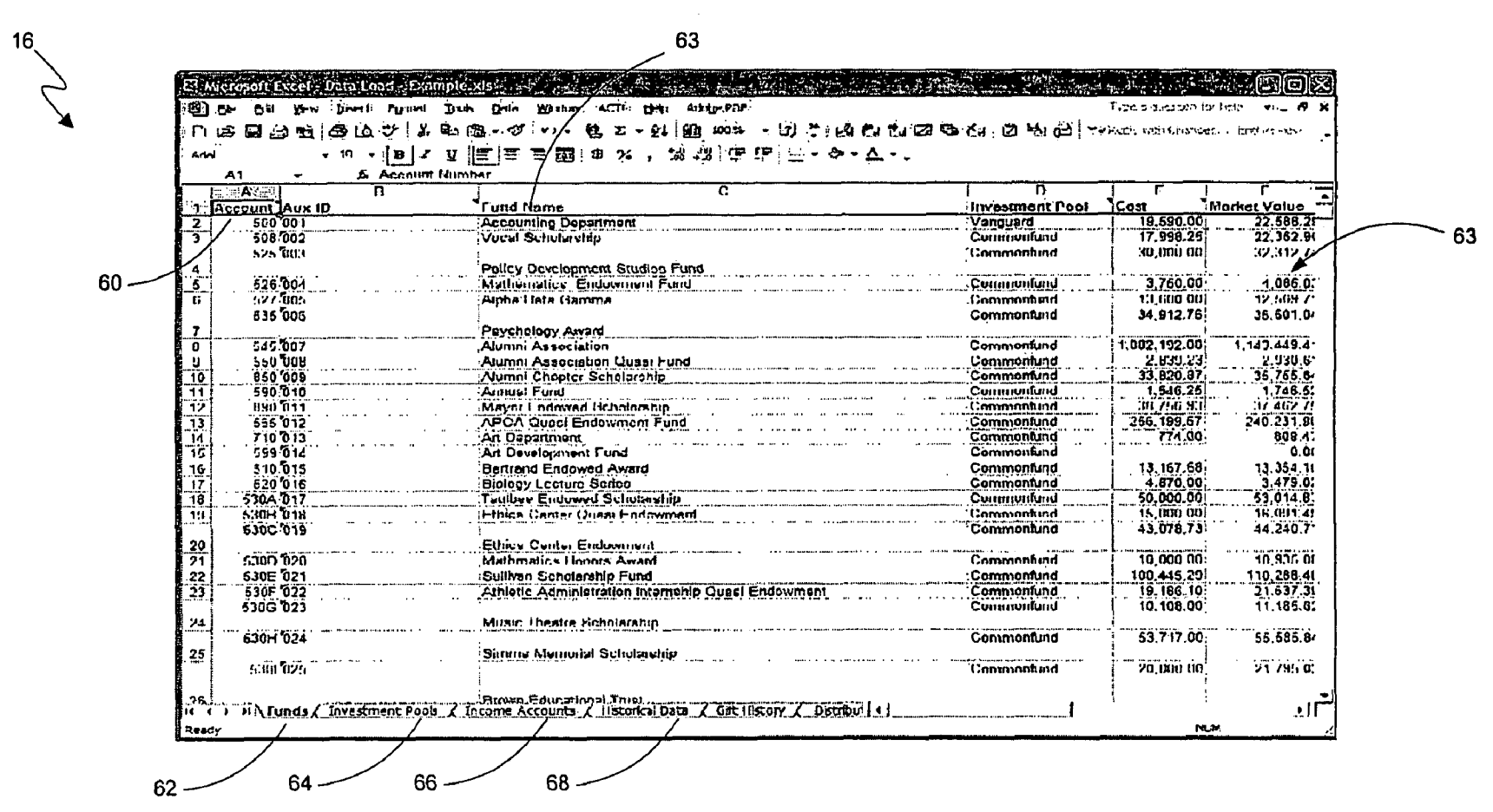

FIG. 3 is a screen shot displaying an example of an import template, according to some aspects of one embodiment of the present inventions. The template may comprise various tabs for different categorical information, such as fund, investment pool, income account, historical data gift history, and distribution data. The main page of the import template 16, which may be located in the Funds tab 62, comprises column headers such as seed data 61, category information 63, and account numbers 60. FIG. 4 displays and describes various columns headers that may be provided in the import template 16. In the example of FIG. 4, the column headers are Account Number, Fund Name, and Market Value or Units.

Seed data 61 can represent the base numerical information (market values, book values, units, and share balances) that is to be imported in the database. Descriptions of the various seed data types may be found in FIG. 4. Seed data 61 may be used by a subaccounting application that is accessing the database as the beginning balances. Category information 63 can represent a group of text columns that allow the user to categorize each fund represented in the import template 16. The user can enter the category in the appropriate cell for each fund. Account numbers 60 can allow the subaccounting application to read information exported from the user's general ledger system. Historical information, located in tab 68, can comprise a portion of the import template 16 that allows the user to import historical fund balances and transactional activity.

Figure 11:
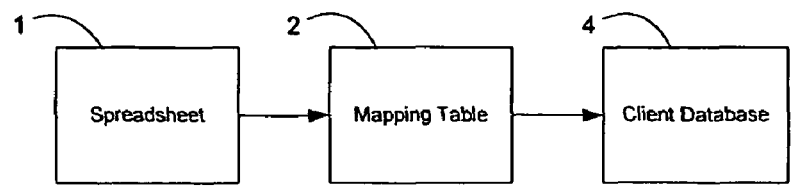
FIG. 11 illustrates an example of use of a mapping table for data conversion, according to one or more aspects of the present inventions.

Moving back to FIG. 2 at block 35, after the import template is completed, the populated import template 16 is sent to the server 20 where it is loaded into the import utility 22. Next, in block 36, the import utility 22 parses the import template data into temporary holding tables. The import utility 22 uses the column headers and worksheet tabs in the import template and a table map in the target database to parse the information into map information from the template into the appropriate table. The mapping table contains database column names and spreadsheet column named and is used to help the software map data from the spreadsheet to the appropriate place in the database. More specifically, the import utility 22 reads the column header in the import template. It then looks up the column name in the mapping table to get the appropriate table and database column to copy the information from the cell in the import template 16 to the database. FIG. 11 illustrates an example of use of such a mapping table according to one or more embodiments. As shown in this example, the setup application reads spreadsheet columns, and the application uses the mapping table to identify the proper corresponding database column. The application reads a cell in the spreadsheet and writes information from the cell to the database.

Figure 5:
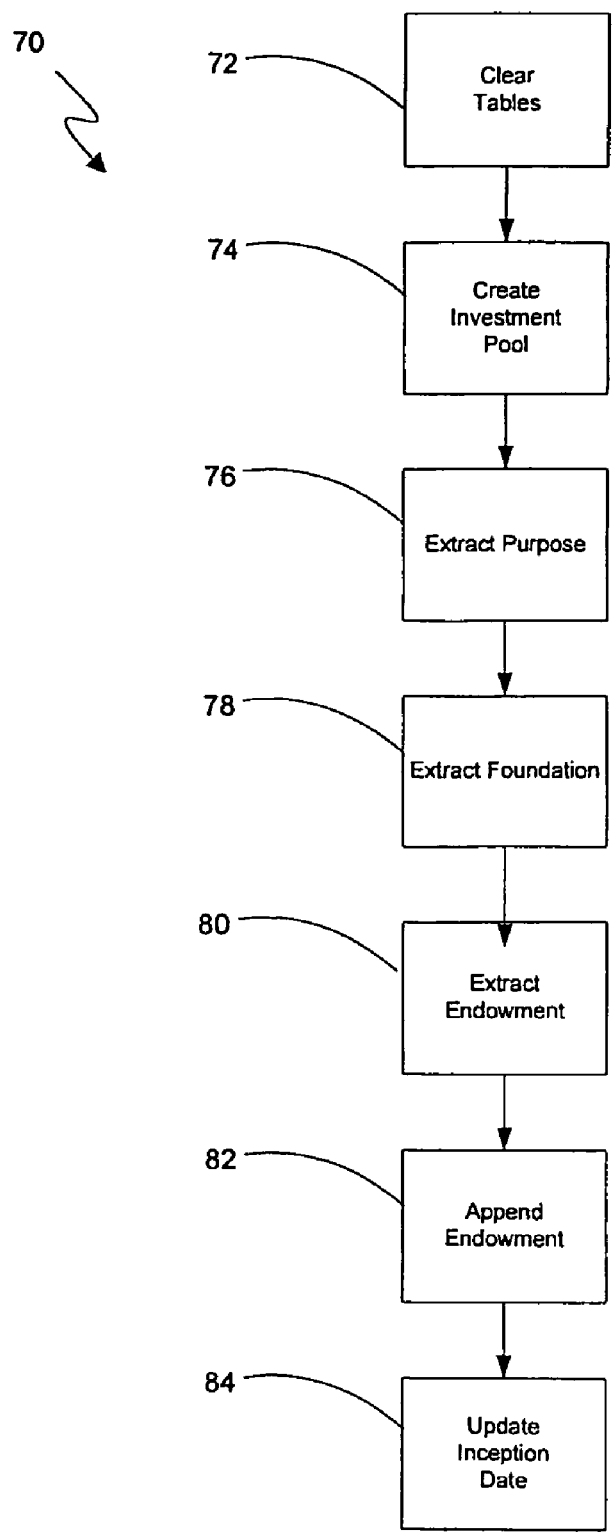
FIG. 5 is a flow diagram illustrating an example of a process in which an investment pool database is created and data is extracted, according to one or more aspects of the present inventions.

FIG. 5 is a schematic illustration of an example of how block 36 of FIG. 2 can be carried out, such as by using various SQL scripts or other programmed methods in which an investment pool database is created and data is extracted, according to one or more aspects of the present inventions. As shown in FIG. 5, the data tables are cleared at block 72, and a new investment pool relational database file is created 74 on the server at block 74. The purpose of the pool, the foundation, and the endowment is extracted from the imported endowment pool data as shown at blocks 76-80. The endowment is then appended to the new file as shown at block 82, and the inception date entered as shown at block 84.

Next, block 38 of FIG. 2 describes the step creating relational data. In this step, duplicated categories in the holding table are eliminated, copied to a new table, and assigned a key number. The category key number is linked back to the fund record. More specifically, when the import utility 22 or conversion application reads the populated import template 16, it groups the entries into categories and makes the data relational. For example, if the word "scholarship" was listed 20 times, the import utility 22 can make one entry. This turns a spreadsheet, which is not relational, into relational data suitable for a database. A relational database is a database that comprises multiple tables that share a relational link with one another. Relational database are desired for large amounts of data because it is easy to query data and to generate reports based on those queries. Additionally, database code residing on the database assists in creating new records in the database, entering data into the database, providing data upon request, and generating reports. Use of a relational database in such a system provides the ability to look up data and generate reports quickly and efficiently. By converting from the spreadsheet data to a relational database, the result is as follows: if a categorization element is listed multiple times in the spreadsheet, it will only be listed once in a database. A link is also established between the endowment entry and the single category entry in the database.

Figure 6:
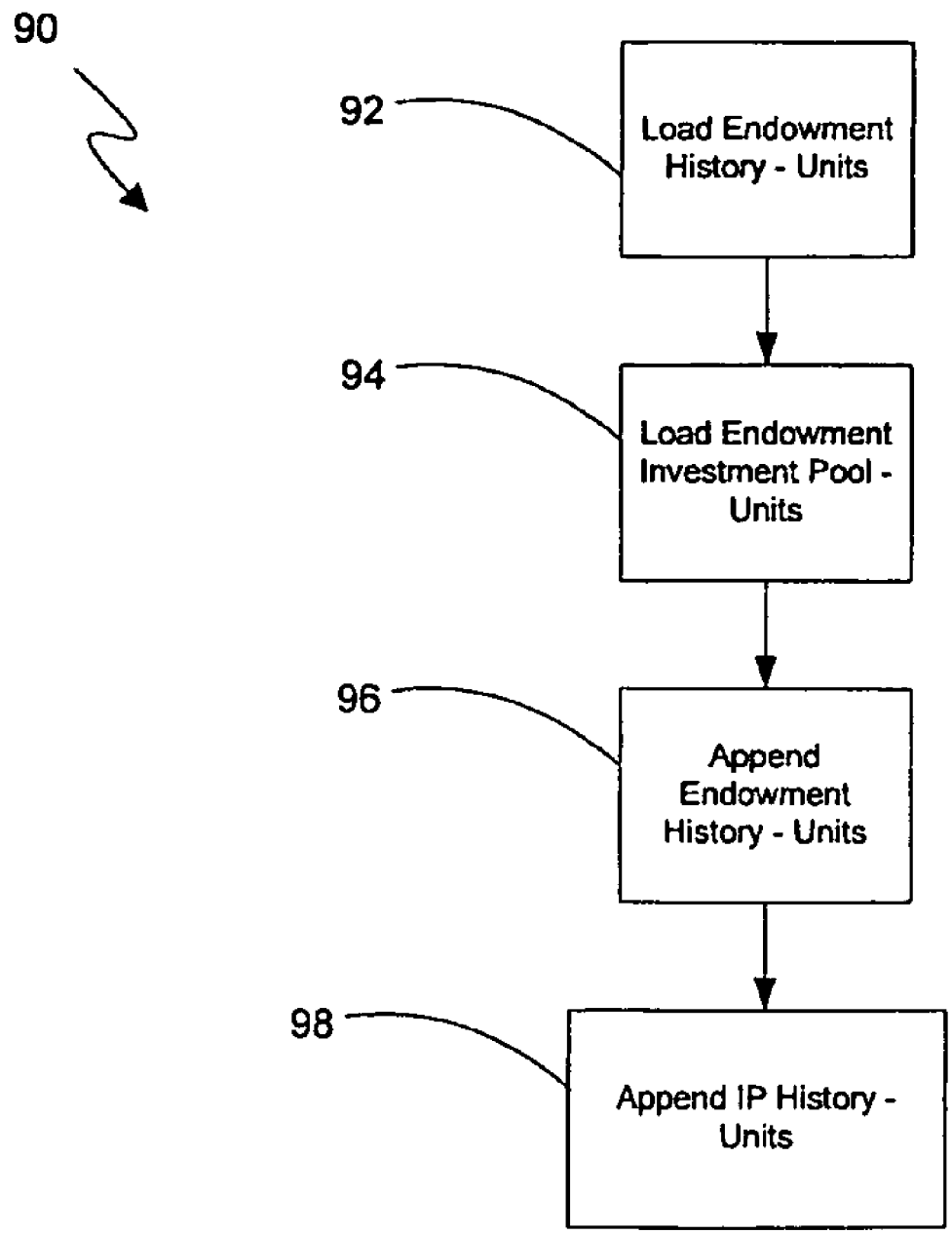
FIG. 6 is a flow diagram illustrating an example of a process in which unit values are loaded and appended to a database, according to one or more aspects of the present inventions.
Figure 7:
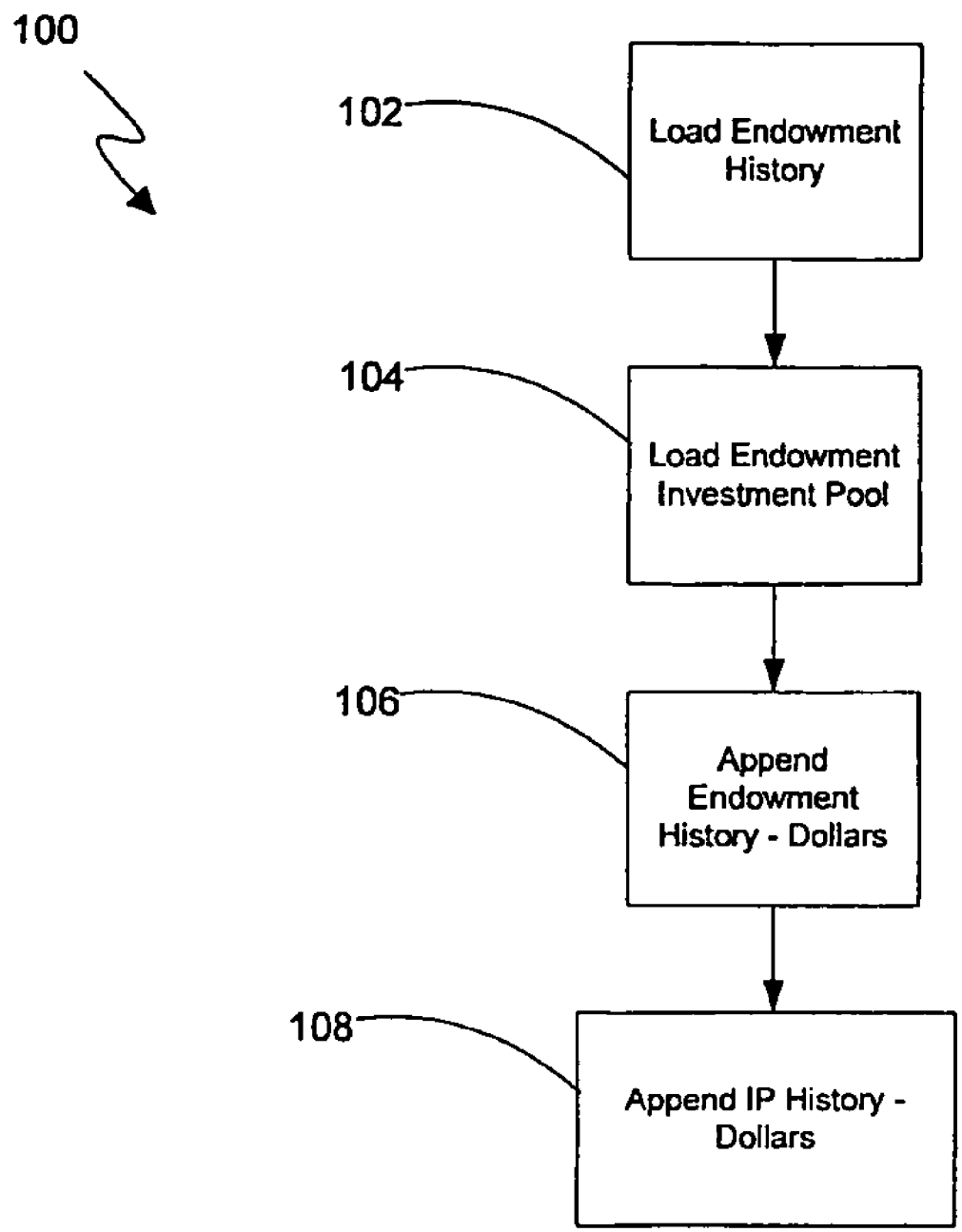
FIG. 7 is a flow diagram illustrating an example of a process in which dollar values are loaded and appended to a database, according to one or more aspects of the present inventions.

Continuing with FIG. 2, block 40, seed balance entries are made. The user may have populated the import template with one of two forms of seed data 61, unit balances or market values. In certain circumstances it is preferable to import unit (or share) balances or market values. Shares represent proportional ownership in a pool of invested assets. Each share has a market value. The value of a fund in a pool with invested assets is the share price times the number of shares. Unitized accounting systems typically keep track of both dollar and share balances and maintain the relationship between the two balances. In some embodiments, the import utility 22 can import shares and calculate the dollar balance or import dollar balances and calculate shares. As shown in blocks 44 and 42 of FIG. 2, if the import template 16 contained unit balances, the import utility derives market values. If the import template 16 contained market values, then the system derives unit balances. FIGS. 6 and 7 are schematic illustrations of SQL scripts or other programmed methods to derive either units or market values, respectively, according to one or more aspects of the present inventions. The example of FIG. 6 can allow for the loading of unit values. When the user selects from the interface that unit values are to be loaded, the method can be executed. The endowment history data in units is loaded into memory on the server from the import template on the client, as is the endowment investment pool data in units, as shown at blocks 92 and 94. The endowment history and investment pool unit data are then appended to the relational database file on the server, as shown at blocks 96 and 98. The example of FIG. 7 can allow for the loading of dollar values. When the user selects from the interface that dollar values are to be loaded, the method can be executed. The endowment history data in dollars is loaded into memory on the server from the import template on the client, as is the endowment investment pool data in dollars, as shown at blocks 102 and 104. The endowment history and investment pool dollar data are then appended to the relational database file on the server, as shown at blocks 106 and 108.

Figure 8:
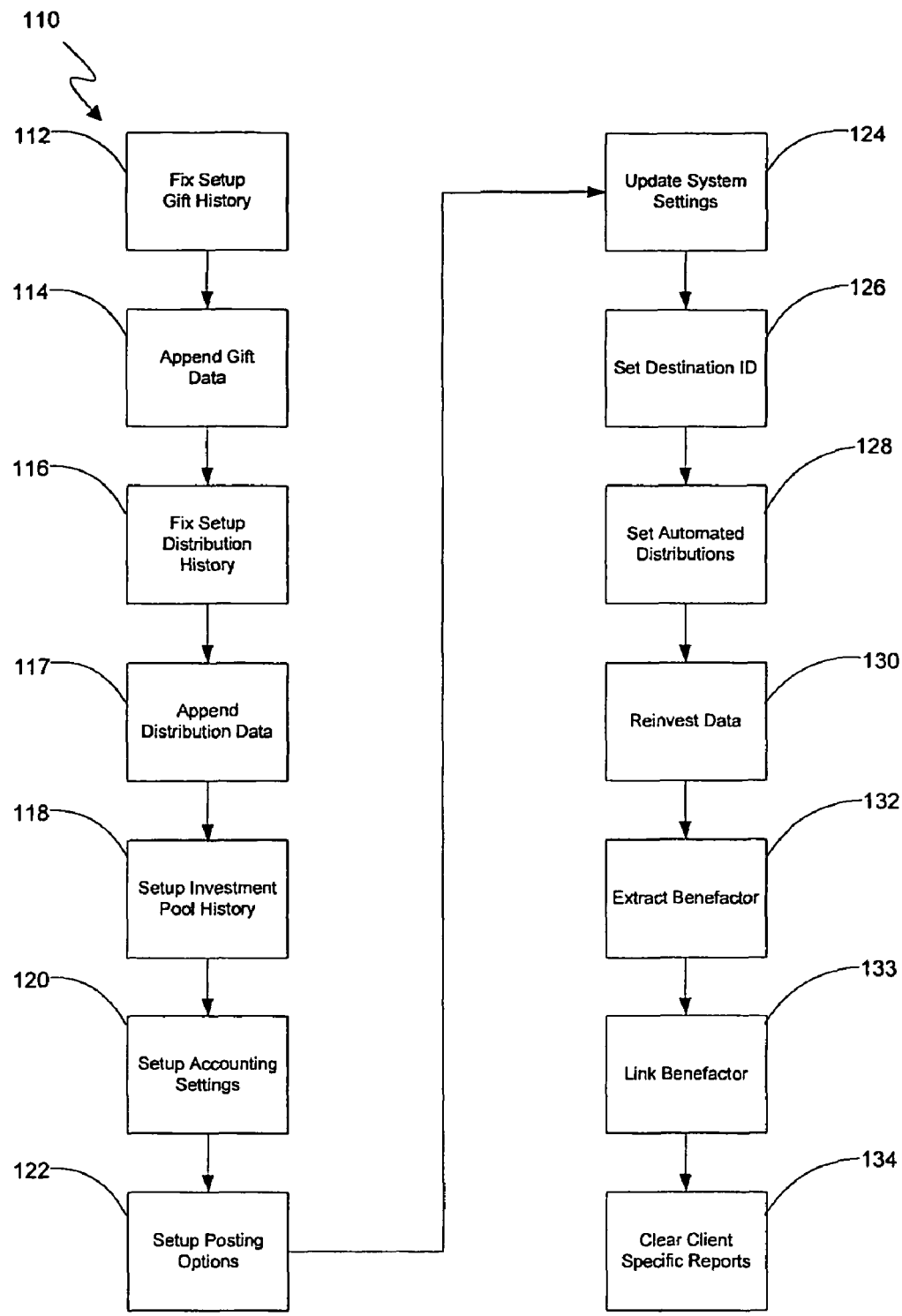
FIG. 8 is a flow diagram illustrating an example of a process in which a database is configured according to one or more aspects of the present inventions.

In FIG. 2, block 46, historical data such as historical fund balances and historical transactional data are loaded into the import utility 22. A user may wish to add not only the seed data 61, but also past transactions and balances. Historical information is loaded into the import template by selecting the Historical Data tab 68 (FIG. 3) and entering in the historical data. The import utility then links the information back to the fund records or the newly created database. In block 46, final configurations are made to the relational database based on the setup profile settings entered in the import utility 22. FIG. 8 is a schematic illustrating scripts or other programmed code that can be utilized in loading a configuring historical data entered into the import template and profile settings selected in the import utility. In this example, the gift history fields are established in the relational database, and the gift data is appended to the database from the import template, as shown at blocks 112-114. At blocks 116-117, the distribution history fields are established in the relational database, and the distribution data is appended to the database from the import template, a shown at blocks 116-117. Investment pool history fields, accounting settings and posting options can then be established in the relational database as shown at blocks 118-122. Defaults can be provided for these entries. System settings are then updated at block 124 and the destination ID is then set in the database, as are automated distributions, as shown at blocks 126-128. Reinvestment data is then provided from the import template to the relational database, at block 130, and the benefactor data is extracted from the import template and linked to the corresponding data in the relational database, as shown at blocks 132-133. Client specific reports are then cleared from the database, as shown at block 134.

Figure 9:
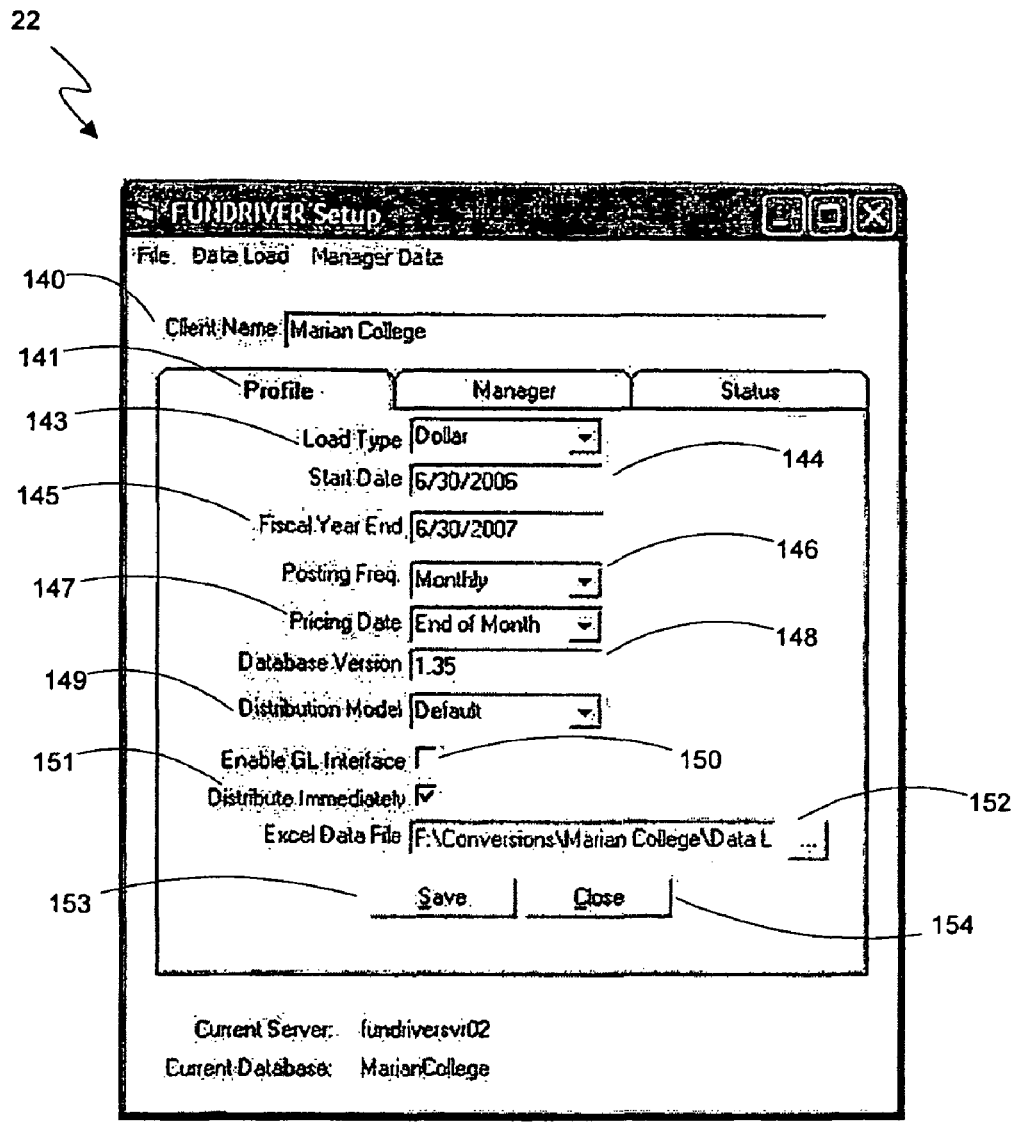
FIG. 9 illustrates an example of an import utility user interface, according to one or more aspects of the present inventions.

FIG. 9 is a screen shot displaying an example of an setup utility user interface, operating according to one or more aspects of the present inventions. The import utility user interface allows a user to select pooled endowment attributes, such has the type of seed data (dollar or units), the start date, the fiscal year end, the posting frequency, the pricing date, the distribution model, the GL interface, when to distribute the assets and the location of the spreadsheet data file. In this example, the client name is entered into the client name field 140. After clicking the Profile tab 141, the configuration setting may be selected. To load dollar amounts, "Dollar" is selected from the load type drop-down box 143. If units are desired, "Units" is selected from drop-down box 143. The start date of the database is entered into start date field 144, and the fiscal year end date is entered into field 145. The posting frequency, which may include "Monthly," "Quarterly" or "Yearly," for example, is selected from posting frequency drop-down box 146. Next, the pricing date preference is selected in drop-down box 147. In some embodiments, the database version may be entered into the database version field 148 and the distribution model is selected from drop-down box 149. GL interface and immediate distributions preferences are selected from check boxes 150 and 151, respectively. The GL interface is used to determine whether the user interface will display the screens related to supporting custom general ledger imports and exports, and the immediate distribution check box determines whether distributable income allocations are distributed immediately or held until requested. Finally, the populated import template 16 is selected in file field 152, and the template 16 is loaded by clicking the save button 153. Clicking the close button 154 closes the import utility 22.

Figure 10:
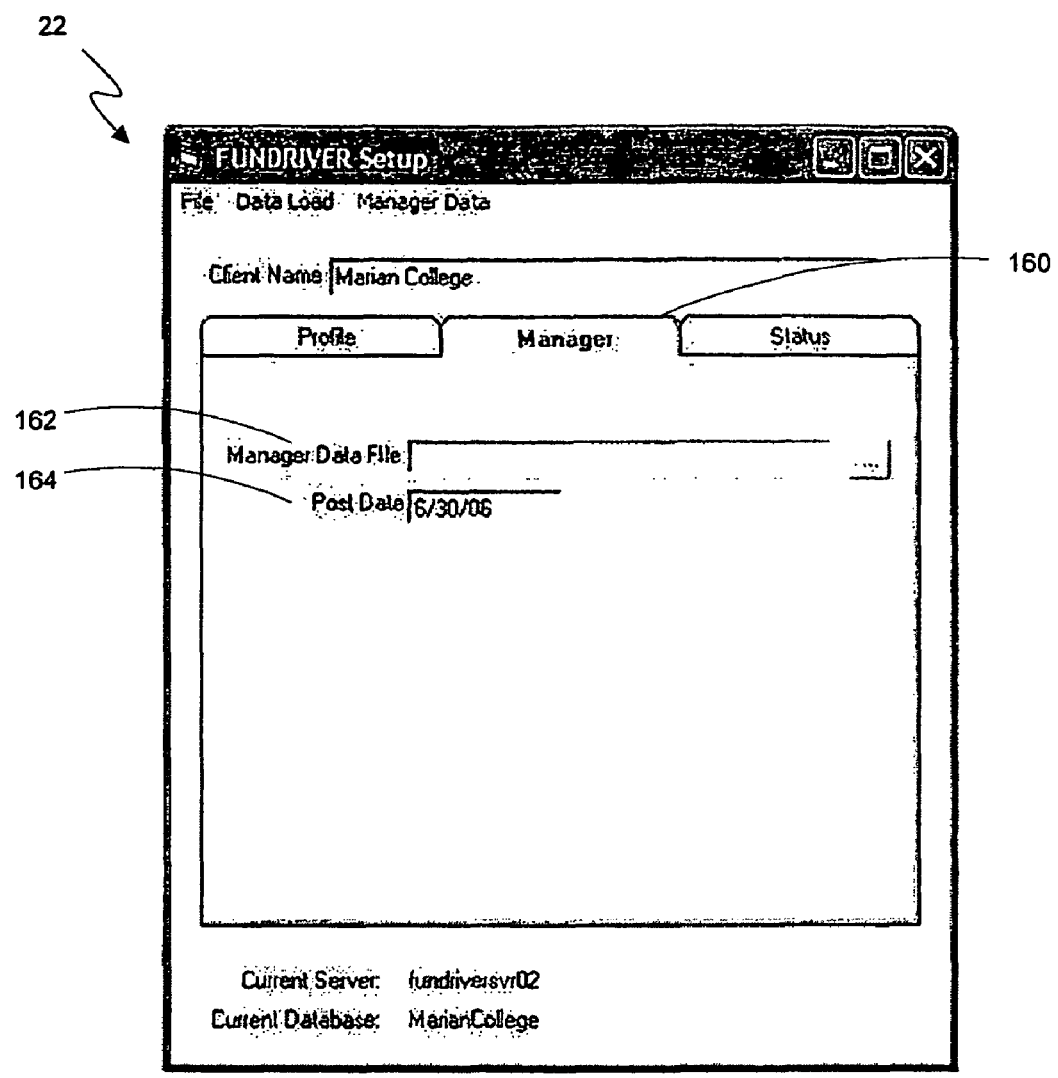
FIG. 10 illustrates an example of an import utility user interface, according to one or more aspects of the present inventions.
Figure 12:
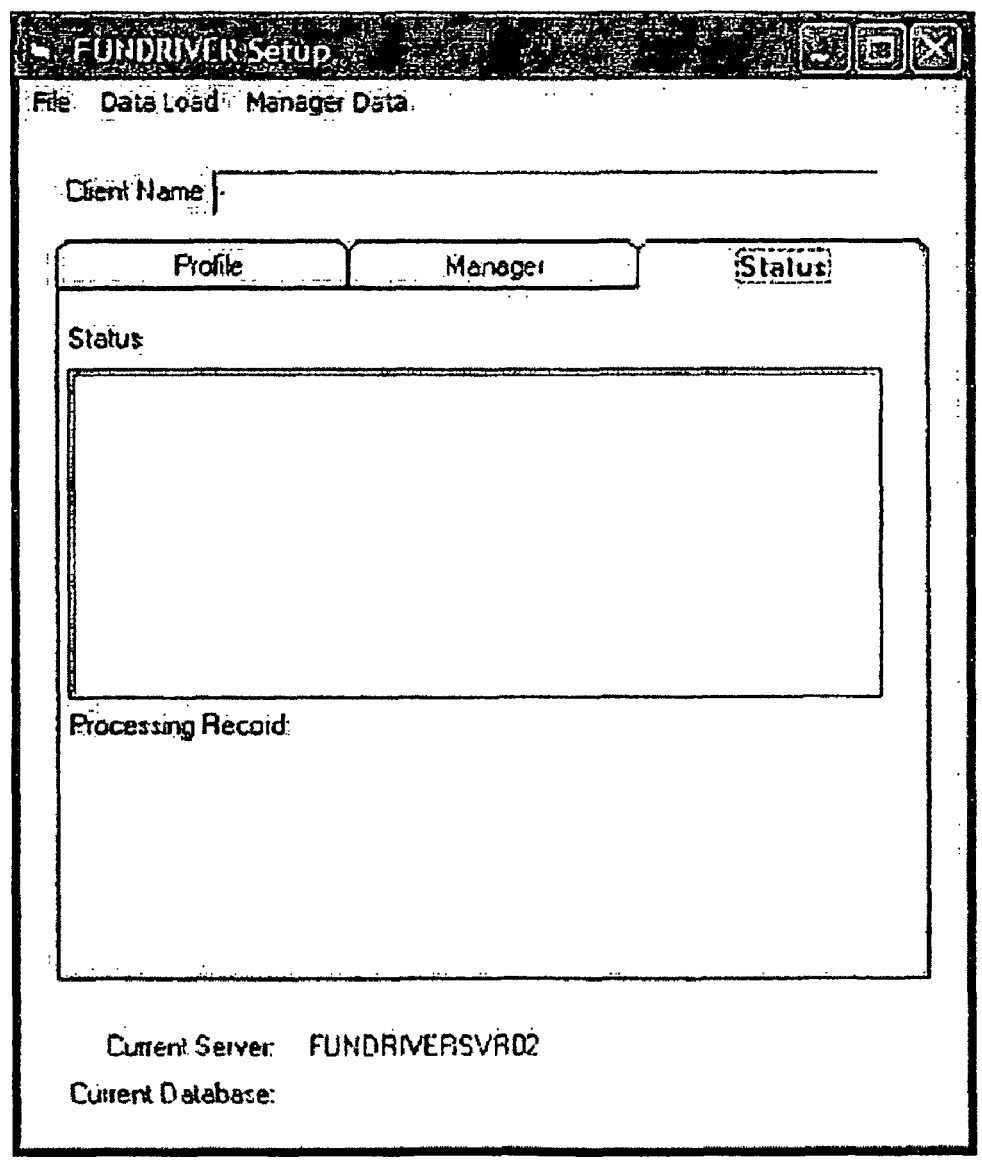
FIG. 12 illustrates an example of a status tab, according to one or more aspects of the present inventions.

FIG. 10 is a screen shot displaying an example of an import utility user interface, operating according to one or more aspects of the present inventions. The information entered into the import template 16 and the import utility may be linked to a manager data file. The manager data file contains market value balances and profile information about the investment managers that comprise the investment pool. The file is selected from the manager data file field 162, and the post date is entered into post date field 164. An example user interface screen for a status tab is illustrated in FIG. 12. As can be understood, the functionality of the routine and the other functionalities described herein can be implemented using software, firmware, and/or associated hardware for carrying out the desired tasks. For instance, the various functionalities described can be programmed as a series of instructions, code, files, or commands using general purpose or special purpose programming languages or programs, and can be executed on one or more general purpose or special purpose computers, processors, other control circuitry, or networks. The functionalities of FIGS. 5-8 for example could be carried out using programmed SQL scripts, for instance. Examples of such scripts that can be used to carry out such functionality are shown below, with section 1 relating to FIG. 5, section 2*a* relating to FIG. 6, section 2*b* relating to FIG. 7, and section 3 relating to FIG. 8.

Section 1

Clear Tables.sql

Create InvestmentPool.sql

ExtractPurpose.sql

Extract College.sql

Extract Foundation.sql

Extract EndowmentType Step 1.sql

Append Endowment.sql

Update InceptionDate.sql

Section 2a—Executed if a Loading Unit Values

Load Endowment History—Units.sql

LoadEndowmentInvPool—Units.sql

Append Endowment History—Units.sql

Append EndowInvPool—Units.sql

Append IP History—Units.sql

Section 2b—Executed if a Dollar Values

Load Endowment History.sql

Load EndowmentInvPool.sql

Append Endowment History—Dollars.sql

Append IP History—Dollars.sql

Section 3

Fix Setup Gift History.sql

AppendGiftData.sql

Fix Setup Distrib History.sql

AppendDistribData.sql

Setup IPHist.sql

Setup Accounting Settings.sql

Setup Posting Options.sql

Update System Settings.sql

Set DestinationID.sql

Set AutomatedDistributions.sql

ReinvestData.sql

Extract Benefactor.sql

Link Benefactor.sql

Link Benefactor2.sql

Clear Client Specific Reports.sql

The foregoing description of various embodiments and principles of the inventions has been presented for the purposes of illustration and description. It is not intended to be exhausted or to limit the inventions to the precise form disclosed. Many alternatives, modifications and variations will be apparent to those skilled in the art. Moreover, although multiple inventive aspects and principles have been presented, such aspects these need not be utilized in combination, and various combinations of inventive aspects and principles are possible in light of the various embodiments provided above. Accordingly, the above description is intended to embrace all possible alternatives, modifications, aspects, combinations, principles, and variations that have been discussed or suggested herein, as well as all others that fall within the principles, spirit and broad scope of the inventions as defined by the claims.

What is claimed is:

1. A system for establishing a database for a pooled endowment fund system, comprising:
an import template provided in a web browser program comprising a plurality of column headers, residing in a client computer and configured to accept pooled endowment data from a flat file source, wherein the pooled endowment data comprises an account header, an ID header, a fund name header, an investment pool header and a seed data header, and wherein seed data within the seed data header comprises unit shares or dollar balances;

a server coupled to the client computer;

an import utility configured to receive the pooled endowment data from the import template;

a plurality of holding tables comprising names corresponding to the plurality of column headers; and a relational database;

wherein the import utility reads the column header in the import template and parses the pooled endowment data received from the import template according the column header by placing the pooled endowment data corresponding to an individual column into an matching holding table, the import utility relates the pooled endowment data by assigning a key number to individual categories in the holding tables, eliminating duplicated categories in the holding tables and linking the key number to an endowment fund record within the relational database.

2. The system as claimed in claim 1 wherein the import template is located on the client computer and the import utility is located on the server.

3. The system as claimed in claim 1 wherein the import template is further configured to accept data that is copied from the flat file source onto a clip board memory location within the client computer and pasted from the clip board memory location into the import template.

4. The system as claimed in claim 1 wherein the pooled endowment data further comprises historical fund balances and transactional data that are appended to the relational database by the import utility.

5. The system as claimed in claim 1 wherein the import utility converts unit shares into dollar balances if unit shares are imported into the import template and the import utility converts dollar balances into unit shares if dollar balances are imported into the import template.

6. The system as claimed in claim 1 wherein the system further comprises a setup utility such that a user may select endowment pool attributes.

7. The system as claimed in claim 1 wherein the import template accepts a plurality of tabs for additional categorical information.

8. The system as claimed in claim 7 wherein the additional categorical information represented by the plurality of tabs comprises fund data, investment pool data, income account data, historical data, gift history data, and distribution data.

9. The system as claimed in claim 1 wherein the import utility is further configured to verify that the pooled endowment fund data within the import template is of a correct format, and place portions of the pooled endowment fund data that is not correct into a temporary holding table.

10. A method for establishing a database for a pooled endowment fund system, comprising:

importing pooled endowment data from a flat file source into an import template provided in a web browser comprising a plurality of column headers, wherein the pooled endowment data corresponds to a plurality of endowment funds that form an endowment pool, and wherein the pooled endowment data further comprises an account header, an ID header, a fund name header, an investment pool header, a seed data header and historical fund balances and transactional data that are appended to a relational database by the import utility;

creating a plurality holding tables that correspond to the plurality of column headers of the import template;

parsing the imported pooled endowment data into corresponding holding tables;

assigning a key to each of a plurality of unique categories within the pooled endowment data located in the plurality of holding tables;

deleting duplicate categories within the pooled endowment data located in the plurality of holding tables;

linking the keys to a pooled endowment fund record in the relational database; and appending the relational database with seed data.

11. The system as claimed in claim 10 wherein the seed data are unit share entries.

12. The system as claimed in claim 10 wherein the seed data are market value entries.

13. The system as claimed in claim 10 wherein the method further comprises populating the relational database with historical data.

14. The system as claimed in claim 10 wherein the import template is located on a client computer and the import utility is located on a server.

15. The system as claimed in claim 10 wherein the import template is further configured to accept endowment fund data that is copied from the flat file source onto a clip board memory location within the client computer and pasted from the clip board memory location into the import template.

16. The system as claimed in claim 10 wherein the import utility converts unit shares into dollar balances if unit shares of the endowment fund are imported into the import template and the import utility converts dollar balances in unit shares if dollar balances are imported into the import template.

* * * * *